(12) United States Patent
Lai

(10) Patent No.: US 7,407,573 B2
(45) Date of Patent: Aug. 5, 2008

(54) QUICK COUNTERCURRENT-TYPE WATER PURIFIER

(76) Inventor: Chieh-Jung Lai, P.O. Box No. 6-57, Junghe, Taipei 235 (TW)

( * ) Notice: Subject to any disclaimer, the term of this patent is extended or adjusted under 35 U.S.C. 154(b) by 551 days.

(21) Appl. No.: 11/014,985

(22) Filed: Dec. 20, 2004

(65) Prior Publication Data

US 2006/0131221 A1    Jun. 22, 2006

(51) Int. Cl.
*B01D 35/16*    (2006.01)
(52) U.S. Cl. .................. 210/143; 210/341; 210/333.1; 210/253
(58) Field of Classification Search .......... 210/108, 210/143, 340, 333.1, 341, 253
See application file for complete search history.

(56) References Cited

U.S. PATENT DOCUMENTS 3,505,037 A * 4/1970 Wood et al. ............... 75/247
4,478,714 A * 10/1984 Blake et al. ............... 210/136
6,120,688 A * 9/2000 Daly et al. ................. 210/650

* cited by examiner

*Primary Examiner*—Terry K Cecil
(74) *Attorney, Agent, or Firm*—Troxell Law Office, PLLC

(57) ABSTRACT

A quick countercurrent-type water purifier configured with two filters, two motors, a control circuit, a purified water storage tank and a waste water tank, wherein a pipe extends from the waste water tank. Moreover, a raw water inlet pipe connects to the pipe through one of the motors that thereon forces water through branch pipes into water inlets at bottoms of the two filters. A pipe branches out from each of the two water inlets, and connects to the waste water tank. A flowmeter is configured at a water outlet at a top portion of each of the filters. An electromagnetic valve subject to control by control circuit is configured at each of the water inlets and the water outlets of the two filters, thereby achieving quick reverse washing of contaminants from filter cores of the filters and providing large quantities of purified water for industrial usage.

9 Claims, 4 Drawing Sheets

QUICK COUNTERCURRENT-TYPE WATER PURIFIER

BACKGROUND OF THE INVENTION (a) Field of the Invention

The present invention relates to a water purifier that is able to provide a relatively large quantity of water, eliminates need to replace filter cores, and which is able to reduce contaminant emission quantity within waste water, and more particularly to a quick countercurrent water purifier that is still able to output a quantity of purified water when reverse washing, and which is applicable for application in industrial locations where large quantities of purified water are needed.

(b) Description of the Prior Art

A simplest conventional filter utilizes interstices in filter material of the filter, whereby raw water is fed into a top portion of the filter material, which then flows down through the filter under gravity, and suspended particles (contaminants) carried by the raw water are caused to be trapped in the interstices of the filter material. An outlet is configured in a bottom of the filter material for purified water to flow out therefrom, thus enabling achieving primary filtration water purification of the contaminated raw water. However, after using the filter material for a period of time, because of the interstices of the filter material becoming filled with the particles from the raw water, thus, the filter material will no longer be able to intercept the contaminants, and sand and dust particles carried by the raw water will remain in the water, thus making it necessary to replace the filter material at regular intervals in order for the purified water obtained after filtering to conform to industrial emission standards.

Referring to Taiwan patent No. 478381, entitled "Countercurrent-type Water Purifier", which, though already improves upon a conventional filter in reverse washing, however, filtering process of the purifier stops when reverse washing, and, thus, has a shortcoming of inability to output purified water during reverse washing. Hence, the countercurrent-type wash water purifier of the cited patent is only suitable for use in households or business usage where water needs are relatively small, and is not suitable for providing sufficient water for industrial usage where quantity of water used is relatively large, thus, such a configuration is extremely nonideal.

SUMMARY OF THE INVENTION

A primary objective of the present invention is to provide a quick countercurrent-type water purifier that can supply a relatively large quantity of water for industrial usage.

In order to achieve the aforementioned objective, the quick countercurrent-type water purifier of the present invention is configured with two filters, two motors, a control circuit, a purified water storage tank and a waste water tank, which function in coordination with a particular arrangement of piping and disposition of a number of electromagnetic valves. Raw water is fed into the purifier and undergoes filtering by passing through the two filters that filter out sand and dust particles and other contaminants from the raw water. After a period of time and when one of the two filters becomes excessively contaminated, the purifier automatically detects such and actuates the electromagnetic valves to alter direction of flow through the piping, and the second motor actuates reverse washing of contaminants of the filter. Upon completing the reverse washing, the filter resumes normal water filtering functionality. The two filters can function in reciprocity, which thereby eliminates replacing filter material, and, upon one of the two filters undergoing reverse washing, not only is purified water yield not effected, moreover, a reserve store of purified water can be used to accelerate reverse washing and reduce water yield of the filter, which thereby achieves quick reverse washing for providing large quantities of water for industrial usage.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
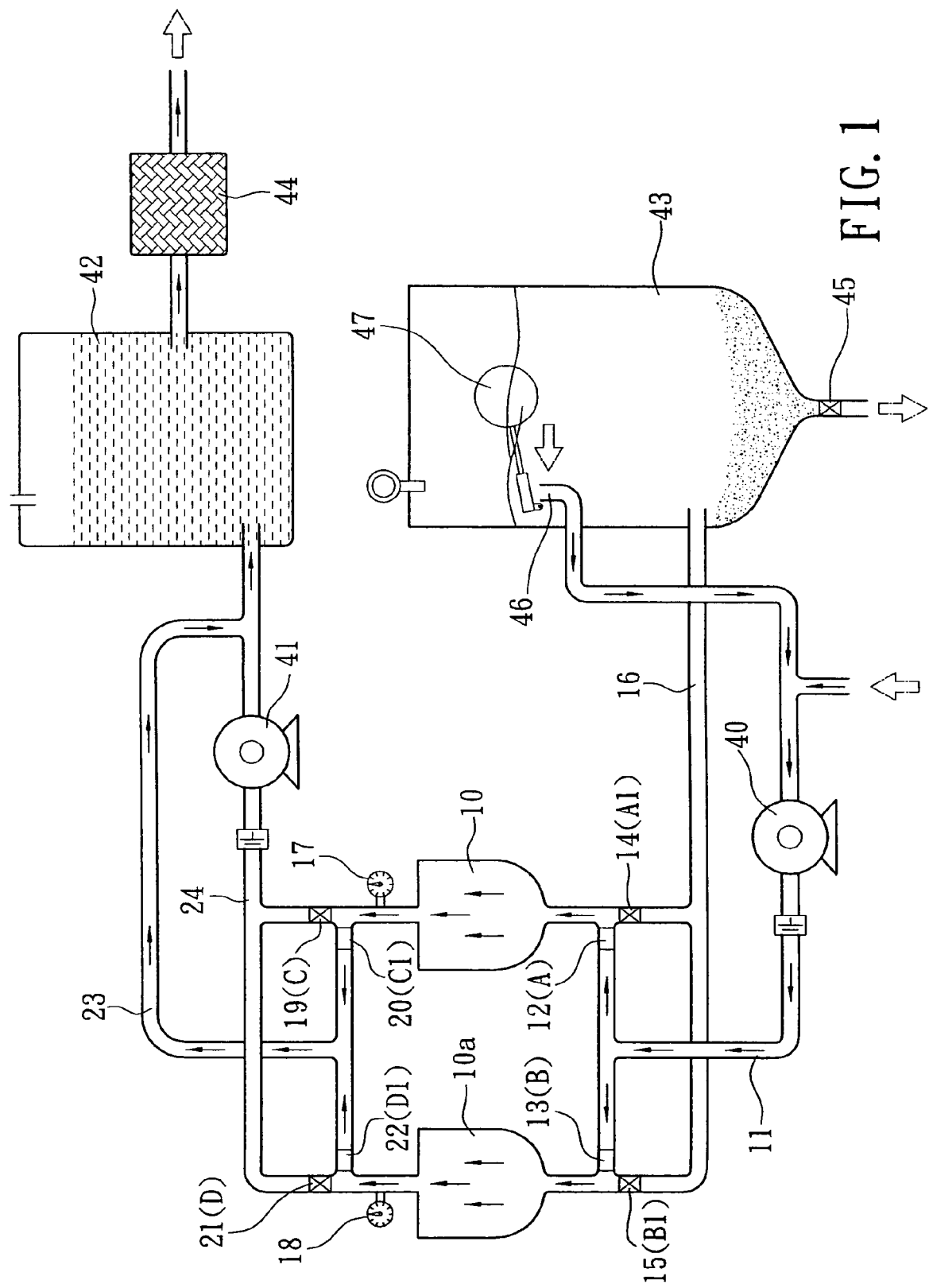
FIG. 1 shows a schematic motion view during normal filtering process according to the present invention.

Referring to FIG. 1, which shows the quick countercurrent-type water purifier of the present invention structured to comprise two filters (10, 10a), two motors (40, 41), a control circuit 30 (see FIG. 4), a plurality of electromagnetic valves, a purified water storage tank 42 and a waste water tank 43, wherein inner structure of the two filters (10, 10a) is identical. A branch pipe is configured to a bottom of each of the two filters (10, 10a), and one end of each of the branch pipes connects to a raw water inlet pipe 11. The raw water inlet pipe 11 is connected in series to the motor 40, which draws out contaminated raw water from the waste water tank 43, and the raw water is thereon fed into the two filters (10, 10a). Moreover, an electromagnetic valve 12 (A) and an electromagnetic valve 13 (B) are respectively configured in the raw water inlet pipe 11 at two side areas of a water inlet of the branch pipe of each of the filters (10, 10a). An electromagnetic valve 14(A1) and an electromagnetic valve 15(B1) are similarly respectively configured at other ends of each of the branch pipes, wherefrom each of the branch pipes connect to a waste water emission pipe 16, which is connected to the waste water tank 43. Flowmeters 17 and 18 are respectively configured on top water outlets of the two filters (10, 10a), and a branch pipe is configured and thereby connects to each of the top water outlets. An electromagnetic valve 19(C) and an electromagnetic valve 20(C1) are respectively configured in outlets of one of the branch pipes, and an electromagnetic valve 21(D) and an electromagnetic valve 22(D1) are configured in outlets of the other branch pipe. The electromagnetic valve 20(C1) and the electromagnetic valve 22(D1) are connected to the purified water storage tank 42 by means of a purified water outlet pipe 23. Furthermore, a reverse wash pipe 24 is configured so as to branch from the purified water outlet pipe 23. The motor 41 is connected in series to a pipe line of the reverse wash pipe 24, and the pipe line then further branches into the branch pipe respectively configured with the electromagnetic valve 19(C) and the electromagnetic valve 21(D), which thereby forms a complete water purification piping device.

Wherein the two normally open electromagnetic valves (12(A), 13(B)) and the two normally closed electromagnetic valves (14(A1), 15(B1)) configured in the branch pipes beneath the two filters (10, 10a) can certainly be replaced with single three-way control valves (not shown in the drawings) as commonly used in conventional art.

Figure 4:
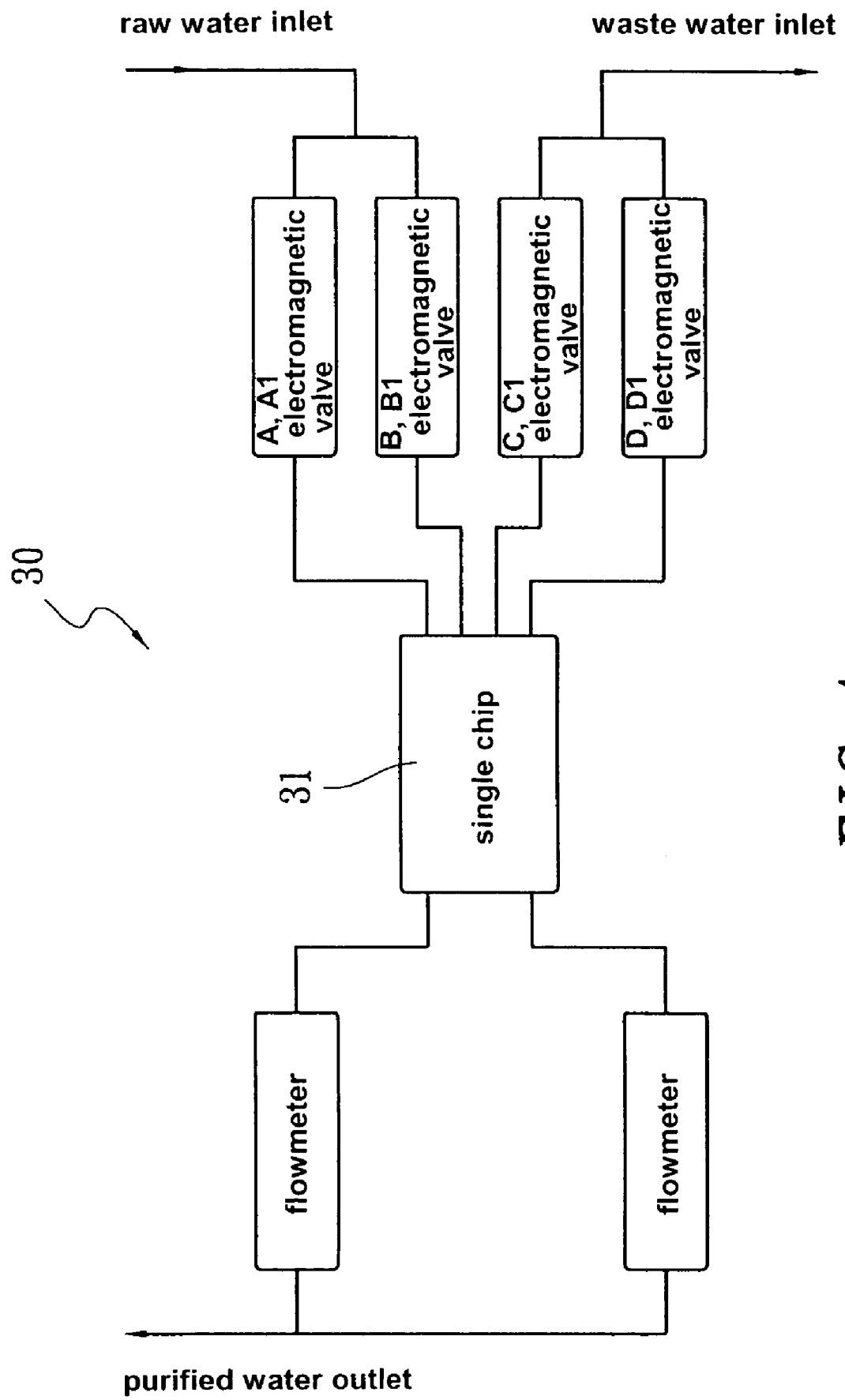
FIG. 4 shows a simple schematic view of a control circuit according to the present invention.

Referring to FIG. 4, the aforementioned four electromagnetic valves 12(A), 13(B), 19(C), 21(D) are all subject to control by a control circuit 30. The control circuit 30 of the present invention comprises a single chip 31 having a control program configured interior thereof. The two flowmeters 17, 18 are used to detect water yield of the two filters (10. 10a) respectively. The electromagnetic valve 12(A), the electromagnetic valve 13(B), the electromagnetic valve 20(C1) and the electromagnetic valve 22(D1) are all configured to be in a normally open state, while the electromagnetic valve 14(A1), the electromagnetic valve 15(B1), the electromagnetic valve 19(C) and the electromagnetic valve 21(D) are all configured to be in a normally closed state. The single chip 31 uses the control program configured interior thereof to coordinate control of the flowmeters 17,18 and the electromagnetic valves 12(A), 13(B), 19(C), 21(D), and the electromagnetic valves 14(A1), 15(B1), 20(C1), 22(D1). When the two flowmeters 17,18 detect normal flow, then each electromagnetic valve respectively maintains the pre-set open state or closed state.

Figure 2:
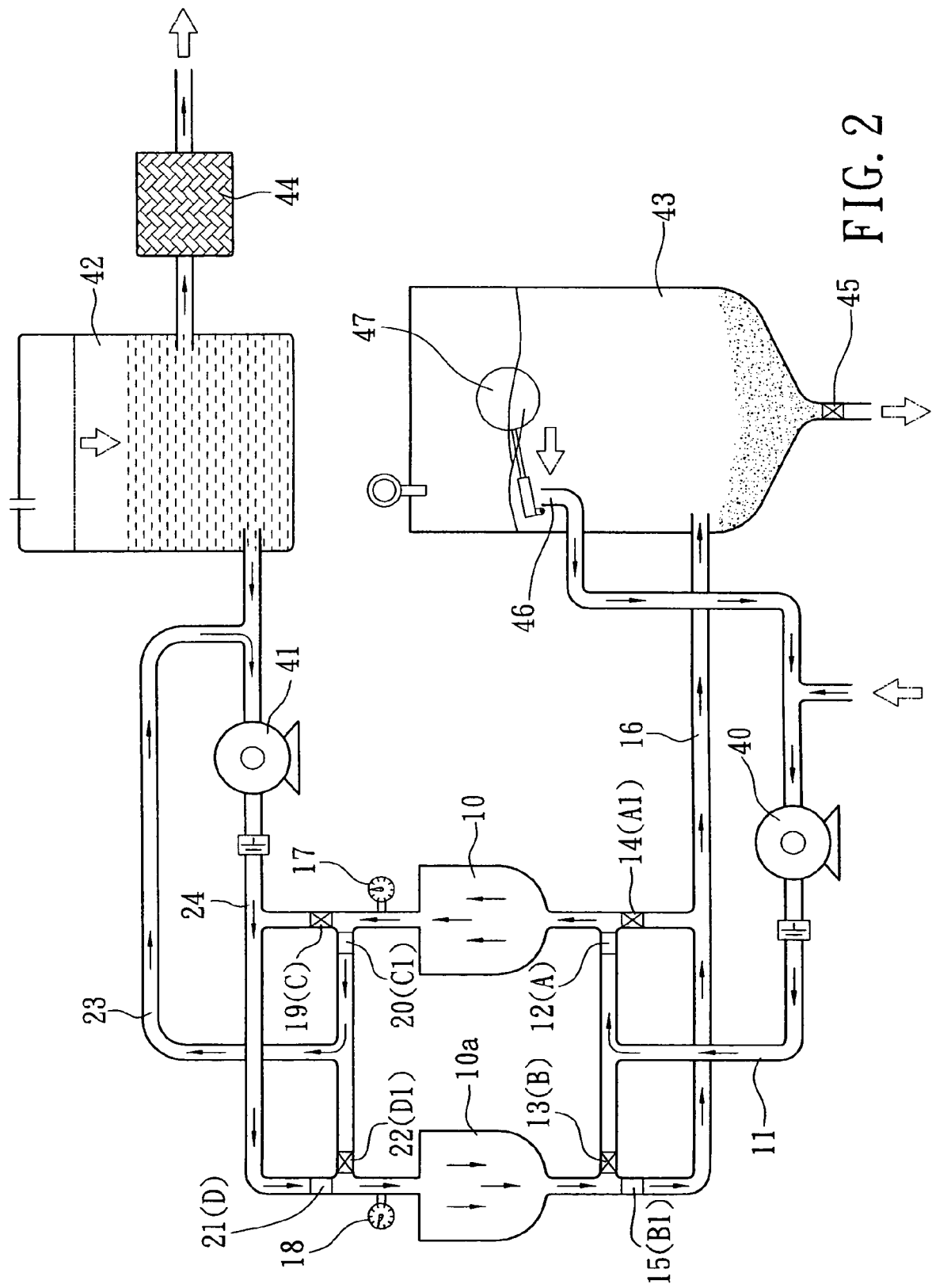
FIG. 2 shows a schematic motion view during filter reverse washing according to the present invention.

Referring to FIG. 2, under normal conditions, the electric motor 40 draws in the raw water into the water inlet pipe 11, which is then fed through the electromagnetic valve 12(IA) and the electromagnetic valve 13 (B) that are in normally open states, and thereon respectively fed into the filters (10, 10a) to undergo filtering. Whereafter, the purified water from the filtering process passes through the flowmeters 17, 18 of the top water outlets and fed into the purified water outlet pipe 23, and finally fed into the purified water storage tank 42. The purified water lastly passes through a filter material chamber 44 to undergo an ultimate filtering process, and wherefrom the purified water is emitted.

Referring to FIG. 2, after operating the water purification procedure for a period of time, if a cotton filter interior of the filter 10a is seriously contaminated causing blockage of the filter 10a, pressure of the raw water wanting to pass through the cotton filter is increased, moreover, the flowmeter 18 of the top water outlet detects a reduced flow in water yield, thus, at such a time, the control circuit 30 signals the electromagnetic valve 13(B) to switch from the normally open state to a closed state, and the electromagnetic valve 15(B1) simultaneously switches from the normally closed state to an open state (that is, the waste water emission pipe 16 allows water to flow out from the filter 10a), and the control circuit 30 concurrently signals the electromagnetic valve 22(D1) to switch from the normally open state to a closed state, and the electromagnetic valve 21(D) switches from the normally closed state to an open state, which thus allows the raw water that feeds into the water inlet pipe 11 to pass completely through the electromagnetic valve 12(A) and be fed into the filter 10. Furthermore, the motor 41 is actuated to draw out the purified water in the purified water outlet pipe 23 and a portion of the purified water stored within the purified water storage tank 42, and feed the drawn-out purified water into the reverse wash pipe 24, whereupon the purified water passes through and reverse washes the cotton filter interior of the filter 10a, thereby enabling the residue sand and dust particles and contaminants on the cotton filter to be quickly washed away, and the waste water carrying the particles and contaminants are thus caused to pass through the open electromagnetic valve 15(B1) and be fed into the waste water storage tank 43 through the waste water emission pipe 16. Upon reaching a Wash time set by the control circuit 30 for cleaning the cotton filter, the electromagnetic valve 21(D) and the electromagnetic valve 15(B1) are once more switched back to the normally closed state (that is, the waste water emission pipe 16 again no longer allows water to flow out from the filter 10a).

After reverse washing and cleaning of the filter 10a (taking approximately 5~8 seconds), the control circuit 30 immediately switches back the electromagnetic valve 22(D1) and the electromagnetic valve 13(B) to the normally open state, thereby reestablishing flow of water through the two side branches of the raw water inlet pipe 11, and the purified water again flows into the purified water outlet pipe 23, thus returning to normal filtering operations of FIG. 1. According to the aforementioned disclosures, during course of reverse wash cleaning of the filter 10a, although the purified water within the purified water outlet pipe 23 is drawn in by the motor 41 after being actuated, however, the water stored within the purified water storage tank 42 is still available for usage from a terminal area of the ultimate purified water outlet, and thus an uninterrupted supply of water is provided.

Figure 3:
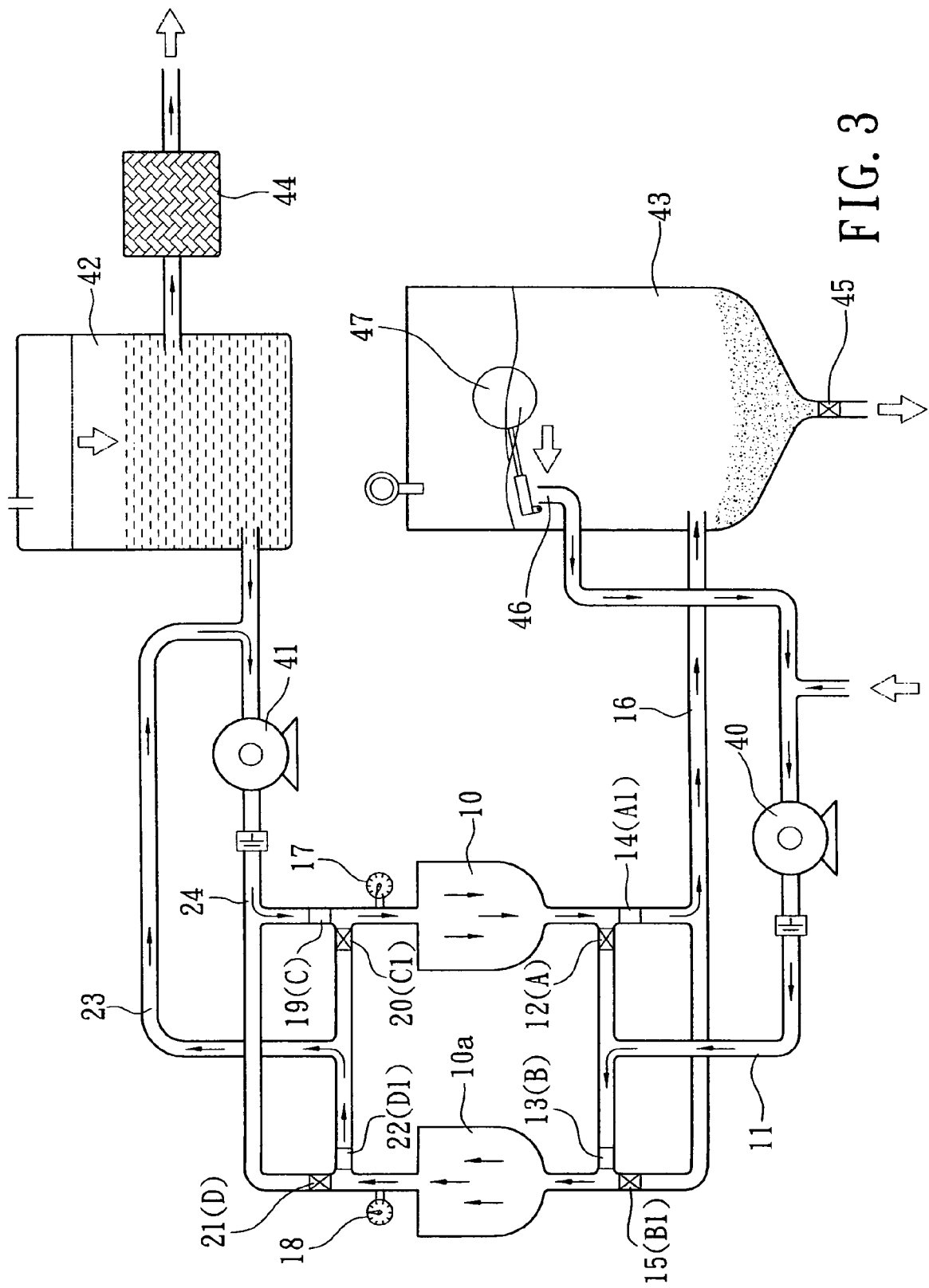
FIG. 3 shows a schematic motion view during another filter reverse washing according to the present invention.

Furthermore, referring to FIG. 3, if the flowmeter 17 of the control circuit 30 detects a reduction in water yield from the filter 10, which indicates that a cotton filter interior of the filter 10 has already reached a serious level of contamination, the electromagnetic valve 12(A) and the electromagnetic valve 20(C1) are switched from the normally open state to the closed state. The electromagnetic valve 14(A1) and the electromagnetic valve 19(C) are switched from the normally closed state to the open state, whereupon effectiveness of reverse washing purification of the cotton filter within the filter 10 is identical to that of the aforementioned for filter 10a, and thereby forms a reverse washing water purification device.

In addition, the waste water emission pipe 16 is connected to the waste water tank 43, and a contaminated emission control valve 45 is configured in a bottom of the waste water tank 43, moreover, an overflow pipe 46 is configured in a top portion of the waste water tank 43. A ballcock 47 is configured at an inlet of the overflow pipe 46, and, moreover, the overflow pipe 46 connects to the raw water inlet pipe 11. Sedimentation of particle contaminants in the waste water released into the waste water tank 43 is discharged from the contaminated emission control valve 45. Furthermore, the filter material chamber 44 is configured rear of the purified water storage tank 42, and interior of the filter material chamber 44 is filled with adsorption material. The filtered purified water thus undergoes an absorption process by further passing through the absorption material, and metallic elements that are difficult to filter out are thereby adsorbed, which ensures output of purified water of superior quality. The waste water from the reverse washing is generally directly discharged, and total emission measure is considerable. Thus, by accumulating the waste water in the waste water tank 43, and after allowing for a period of time of sedimentation, the contaminated sedimentation contained in the waste water is discharged by opening of the contaminated emission control valve 45 controlled by the control circuit 30, and stays open until a discharge time set in the single chip 31 is reached, whereupon the contaminated emission control valve 45 is closed. Furthermore, the contaminated emission control valve 45 can be manually opened to discharge the contaminated sedimentation. When height level of the waste water that has undergone sedimentation goes above height of the ballcock 47, the ballcock 47 automatically opens an inlet of the overflow pipe 46, which thereby allows the waste water that has undergone sedimentation to again mix with the raw water, and to reenter the filtering process, thus achieving effectiveness of reducing amount of the waste water.

According to the aforementioned description of structural characteristics, assembly configuration and practical implementation method of the present invention, structural configurational characteristics of the present invention can be easily seen to have the following advantages:

1. Under normal conditions, the purified water that has undergone filtering is stored in the purified water storage tank 42, and, upon proceeding with reverse washing of the filters (10, 10a), an abundant quantity of purified water can still be provided to a user.

2. Adopts a countercurrent mode, whereby need to replace the cotton filters is eliminated.

3. Effectuates reutilization of the waste water, which thereby substantially reduces amount of the waste water.

4. The filter material chamber 44 filled with the absorption material is further configured at the purified water outlet of the purified water storage tank 42, wherewith metallic elements are absorbed from the filtered purified water, and which thereby achieves effectiveness of providing purified water of superior quality.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A quick countercurrent-type water purifier comprising: two filters, two motors, a purified water storage tank and a waste water tank, wherein a top water outlet of each of the two filters is respectively configured with a flowmeter and a top branch pipe, a top valve is configured in each of two ends of each of the top branch pipes, and a top connecting pipe is configured between each of two of the valves of each respective one of the top branch pipes, wherein a first of the top branch pipes after connecting to a first motor of the two motors connects to a second of the top branch pipes by means of another branch pipe and converges therewith to flow into the purified water storage tank; a bottom branch pipe is configured to a water inlet at a bottom of each of the two filters, and a bottom valve is configured in each of two ends of each of the bottom branch pipes, and a bottom connecting pipe is configured between each of two of the valves of each respective one of the bottom branch pipes, the bottom branch pipes connect to a raw water inlet pipe and a waste water tank respectively, a second motor of the two motors is configured to the raw water inlet pipe.

2. The quick countercurrent-type water purifier according to claim 1, wherein the valves are electromagnetic valves.

3. The quick countercurrent-type water purifier according to claim 1, wherein a control circuit is further configured in the water purifier.

4. The quick countercurrent-type water purifier according to claim 1, wherein the bottom valves respectively configured in the water inlet branch pipe at the bottom of each of the filters that connect to the raw water inlet pipe are set to be in normally open state.

5. The quick countercurrent-type water purifier according to claim 1, wherein the bottom valves respectively configured in the water inlet branch pipe at the bottom of each of the filters that connect to the waste water emission pipe are set to be in normally closed state.

6. The quick countercurrent-type water purifier according to claim 1, wherein the top valves respectively configured in the water outlet branch pipe atop of each of the filters, and that connect to one of the motors, are set to be in normally closed state.

7. The quick countercurrent-type water purifier according to claim 1, wherein the top valves respectively configured in the water outlet branch pipe atop of each of the filters, and that connect to the purified water storage tank, are set to be in normally open state.

8. The quick countercurrent-type water purifier according to claim 1, further comprising a contaminated emission control valve is configured in a bottom of the waste water tank, and an overflow pipe is configured in a top portion of the waste water tank, the overflow pipe connects to the raw water inlet pipe, and a ballcock is configured at an inlet of the overflow pipe.

9. The quick countercurrent-type water purifier according to claim 1, further comprising a filter material chamber is further configured to the purified water storage tank, and interror of the filter material chamber is filled with adsorption material.

* * * * *